United States Patent
Gerhard

(10) Patent No.: US 7,499,904 B2
(45) Date of Patent: Mar. 3, 2009

(54) SYSTEM AND METHOD FOR CLIENT MASTERED REPLICATION OF LOCAL FILES

(75) Inventor: Lutz Gerhard, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 462 days.

(21) Appl. No.: 10/722,247

(22) Filed: Nov. 25, 2003

(65) Prior Publication Data

US 2005/0114412 A1  May 26, 2005

(51) Int. Cl.
  *G06F 17/30* (2006.01)
(52) U.S. Cl. .............................. 707/1; 707/10; 707/100; 707/200; 707/201
(58) Field of Classification Search ................ 707/1–10, 707/101, 201, 202, 204, 100, 200; 709/203; 714/6; 719/313
  See application file for complete search history.

(56) References Cited

U.S. PATENT DOCUMENTS

| | | | | |
|---|---|---|---|---|
| 5,452,448 | A | * | 9/1995 | Sakuraba et al. ............ 707/201 |
| 5,588,147 | A | * | 12/1996 | Neeman et al. ................ 707/1 |
| 5,630,116 | A | * | 5/1997 | Takaya et al. ............... 707/201 |
| 5,819,272 | A | * | 10/1998 | Benson .......................... 707/8 |
| 6,412,017 | B1 | * | 6/2002 | Straube et al. .............. 719/313 |

OTHER PUBLICATIONS

Terry et al., The Case for Non-transparent Replication: Examples from Bayou, 1998, IEEE, pp. 1-10.*
Guerraoui et al., Software_Based Replication for Fault Tolerance, 1997, IEEE, pp. 68-74.*
Ratner, D. et al., "Replication Requirements in Mobile Environments", *Mobile Networks and Applications*, 2001, 6, 525-533.
Ruan, Z. et al., "Performance Analysis of File replication Schemes in Distributed Systems", *ACM*, 1987, 205-215.
Saito, Y. et al., "Taming Aggressive Replication in the Pangaea Wide-Area File System", 5th Symposium on Operating Systems Design and Implementation, UNISEX Association, 15-30.
Stanski, P. et al., "Document Archiving, Replication and Migration Container for Mobile Web Users", *ACM*, 1998, 400-404.
Tichy, W.F. et al., "A Replicated, Distributed File System", Department of Computer Science.

* cited by examiner

*Primary Examiner*—Pierre M Vital
*Assistant Examiner*—Fred I Ehichioya
(74) *Attorney, Agent, or Firm*—Woodcock Washburn LLP

(57) ABSTRACT

A master file may be created and stored on a client computing device. Changes to the master file may be made locally at the client computing device. The master file may be selected for replication using an associated replication property. Changes to the master file may be replicated to a connected computing device such as a server. Changes to a replica of the master file may be made at the connected computing device. If they do not conflict with local changes the to master file, changes to the replica may be replicated back to the master file.

17 Claims, 7 Drawing Sheets

(PRIOR ART)

600

SYSTEM AND METHOD FOR CLIENT MASTERED REPLICATION OF LOCAL FILES

FIELD OF THE INVENTION

The present invention relates to the field of data replication and, more specifically, to creating and storing a master file on a client computing device and replicating the master file to other connected computing devices.

BACKGROUND OF THE INVENTION

Conventional computing devices enable data files to be accessed at a wide range of locations and times. For example, desktop computing devices enable files to be accessed at a specific location such as a home or an office, while a variety of portable computing devices enable data to be accessed at mobile locations such as in a car, train, or airport. The ability to access files at a wide range of locations and times enables users to employ multiple computing devices to work on a single file. For example, a user may begin work on a document using a desktop computer at his office, then do more work on the document using a portable computer on a train, then do more work on the document using a desktop computer at his home. The practice of using multiple computing devices to work on a single file has created a need to efficiently replicate files from one computing device to another.

One conventional method for replicating files from one computing device to another is server mastered replication. The term "server", as used herein, refers to a computer that stores files that are accessed by another computer. The term "client", as used herein, refers to a computer that accesses files stored at another computer. The term "master", as used herein, refers to a file that controls the operation of another file. In server mastered replication, a master version of a file is stored on a server, and replicas of the master are stored on connected clients. Changes made to the master are propagated to the client replicas. One drawback of server mastered replication is that it may not be desirable to propagate changes to the client replicas. For example, even if a master file is deleted, it may be valuable not to delete a client replica.

Another conventional method for replicating files is file sharing, in which shared files may be accessed at other connected computing devices. A file may be made available for sharing by copying the file to a sharing folder. A service provider such as, for example, an Internet service provider (ISP) may operate a file sharing subscription service. The service provider may copy the contents of a sharing folder from a subscribing client to a server. The service provider may store the copied contents of the sharing folder at the server. The service subscriber may then make the contents of the sharing folder available to subscribers on other connected clients via the server.

There are several drawbacks to sharing folder replication. One such drawback is that files must be copied to the sharing folder from their source location. Such copying of files may be a time-consuming and tedious process. Furthermore, a user may have difficulty determining which copy of the file contains the most recent changes. Another drawback to sharing folder replication is that it is difficult for the user to achieve parity between the local folder structure he has organically created over the years and the sharing folder structure. The user must keep the local folder structure and the sharing folder structure in sync. If, for simplification, the user decides to use only the sharing folder structure, then he must copy all files from the local file structure. If all local files are copied, then they all must always be replicated, which results in a lot of storage space usage. The user is left with several management tasks with respect to synchronizing file structures and ensuring that the storage limit is not exceeded.

Thus, there is a need in the art for an efficient replication system in which a master version of a file may be created and stored at a client. Changes to the master may be replicated to connected computing devices such as a server. It is desired that the system enable individual files to be designated for replication without the need to copy such files to a special sharing folder.

SUMMARY OF THE INVENTION

The present invention is directed to systems and methods for client mastered replication. A master file may be created and stored on a client computing device. Changes to the master file may be made locally at the client computing device. Changes to the master file may be replicated to a connected computing device such as a server. Changes to a replica of the master file may be made at the connected computing device. If they do not conflict with local changes to the master file, changes to the replica may be replicated back to the master file.

According to an aspect of the present invention, the master file may be selected for replication using an associated replication property. In addition to selecting individual files for replication, the replication property may be used to select entire folders for replication. Thus, a user may select the entire contents of a folder without manually selecting each individual file within the folder for replication. In addition to a replication property, the master file may have associated replication options. Such replication options may include, for example, a replication level option which determines whether the entire contents of the master file will be selected for replication or whether only portions of the contents will be selected. Replication may be selected, for example, on a paragraph by paragraph level, a section by section level, or a page by page level.

According to another aspect of the present invention, the master file may be replicated to the connected computing device in response to an event occurring at the client computing device. For example, a replication time interval may be selected by a user at the client computing device, and the master file may be replicated at an expiration of the selected time interval. Furthermore, the master file may be replicated when it is closed, when it is saved, and when the client computing device is shut down. Additionally, the master file may be replicated in response to a request from the connected computing device.

According to another aspect of the present invention, the master file may be created and stored at a master client and a replica of the master file may be accessed at a replication client. In such an embodiment, the master file may be replicated to a server with a first replica of the master file being stored on the server. The first replica may then be replicated to the second client, with a second replica being stored on the replication client. Changes to the second replica may be made at the replication client. Such changes may then be replicated back to the first replica at the server and, in turn, replicated back to the master file.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which.

DETAILED DESCRIPTION OF ILLUSTRATIVE EMBODIMENTS

We will now explain the present invention with reference to presently preferred, exemplary embodiments. We will first describe an illustrative computing and development environments in which the invention may be practiced, and then we will describe presently preferred implementations of the invention.

Illustrative Computer Environment

Figure 1:
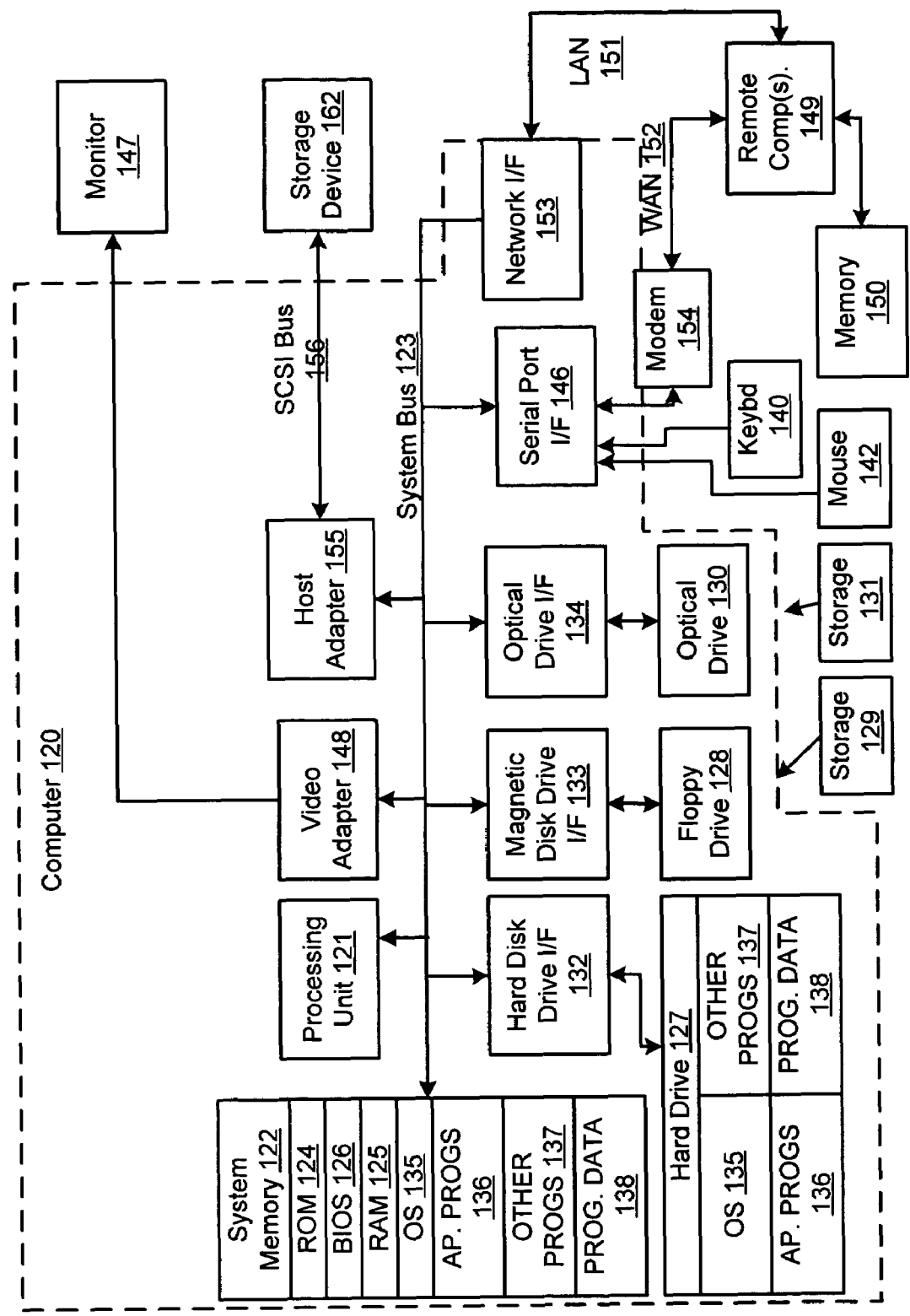
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a application service. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application 212 programs 136, other program modules 137 and program data 138. A user may enter commands and information into the personal computer 120 through input devices such as a keyboard 140 and pointing device 142 such as a mouse. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a application service, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Exemplary Server Mastered Replication System

Figure 2:
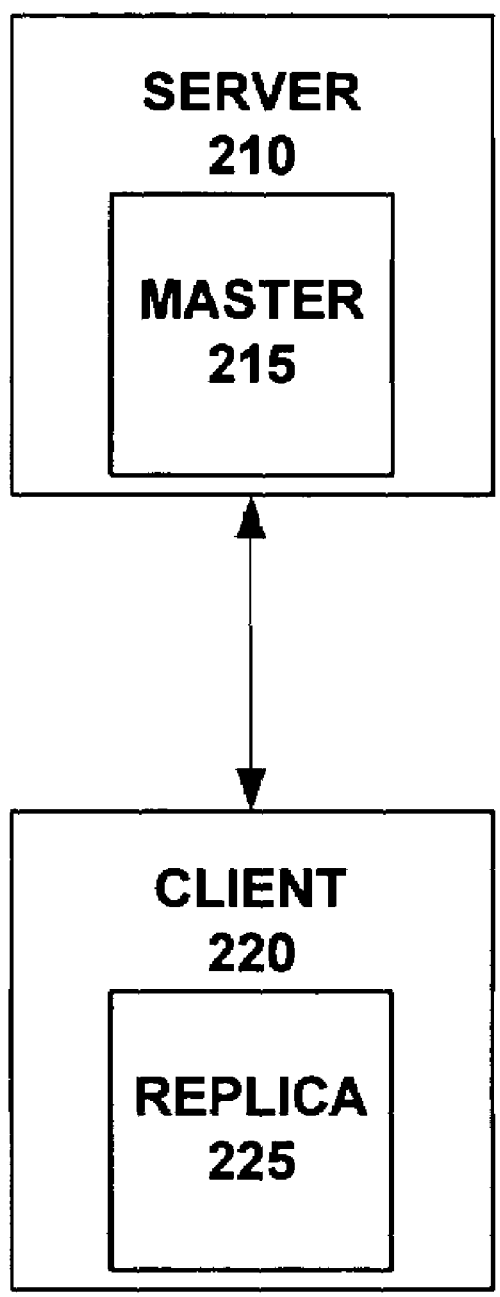
FIG. 2 is a block diagram of an exemplary prior art server mastered replication system.

An exemplary prior art server mastered replication system 200 is shown in FIG. 2. Server 210 operates in connection with client 220. Server 210 may connect with client 220 via a local area network (LAN) or a wide area network (WAN) such as the Internet. As should be appreciated, other clients may also be connected to server 210. A master version 215 of a data file is stored on server 210. A replica 225 of master version 215 is stored on client 220. Generally, replica 225 is a mirror of master 215, meaning that changes made to master 215 are propagated to replica 225. Changes may be made locally to replica 225 at client 220 and, if such local changes do not conflict with changes to master 215, such local changes may be replicated back to master 215.

As should be appreciated, although only a single client 220 is shown in FIG. 2, multiple other clients may be connected to server 210. Each such connected client may store its own associated replica of master 215. A local change to replica 225 at client 220 may be related a change to another replica at another connected client. For example, a particular row may be both deleted at client 220 and modified at another client. When such related changes are replicated back to server 210 from client 220 and from the other connected client, such related changes may result in a conflict. Such a conflict may be resolved according to one of several conventional conflict resolution schemes, which are discussed in detail below with reference to FIG. 3.

Figure 3:
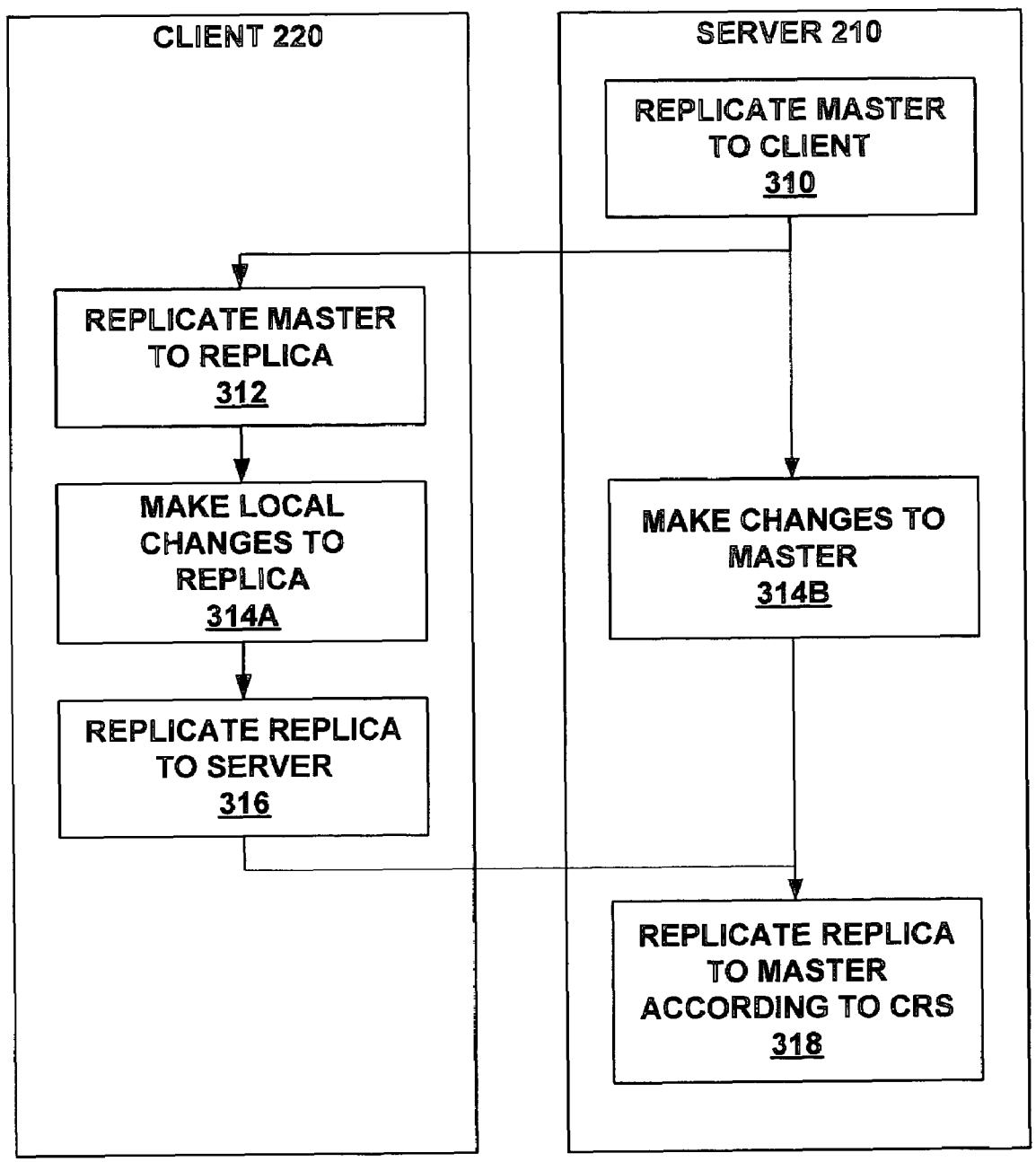
FIG. 3 is a block diagram of an exemplary prior art method for server mastered replication.

A flowchart of an exemplary prior art server mastered replication method is shown in FIG. 3. At step 310, server 210 replicates master 215 to client 220. Master 215 may be replicated to client 220 by identifying new changes made at master 215 and replicating such new changes to client 220. The term "new" changes, as used herein, refers to changes made since a previous replication to the device currently being replicated to.

At step 312, client 220 replicates master 215 to replica 225. At step 314a, local changes are made to replica 225 at client 220. For example, words may be inserted in both the second row and in the seventh row of replica 225.

At step 314b, changes are made to master 215. Such changes may originate directly from server 210. Alternatively, as set forth above, such changes may be replicated to server 210 from another connected client. For example, at another connected client, the third row of a replica may be deleted. This change may be then replicated back to master 215, resulting in the third row being deleted from master 215 at step 314b.

At step 316, client 220 replicates replica 225, which includes local changes made at step 314a, to server 210. Replica 225 may be replicated to server 210 by identifying the local changes made to replica 225 at step 314a and replicating such local changes to client 220.

At step 318, server 210 replicates replica 225 to master 215 according to a conflict resolution scheme. It may first be determined whether any conflicts exist between the local changes made at step 314a and the server changes made at step 314b. If no conflicts exist, then the local changes made at step 314a are replicated to master 215. If there are existing conflicts, then a conflict resolution scheme may be implemented.

For example, because the seventh row of master 215 was not previously deleted at step 314b, the word inserted into the seventh row of replica 225 at step 314a may also be inserted into the seventh row (now the sixth row) of master 215. However, because the third row of master 215 was previously deleted at step 314b, the word that was inserted into the third row of replica 225 at step 314a cannot be inserted into the third row of master 215 at step 318. Thus, a conflict is present. There are several conventional conflict resolution schemes that are well know in the art that may be implemented at step 318.

For example, in one conventional conflict resolution scheme, if conflicts are present, then the entire transaction is rolled back and none of the local changes are replicated to master 215. For example, neither of the words inserted into replica 225 at step 314a are replicated to master 215.

In another conventional conflict resolution scheme, if conflicts are present, then only the non-conflicting changes are replicated to master 215. For example, the word inserted into the seventh row of replica 225 at step 314a is replicated to master 215, but the word inserted into the third row of replica 225 at step 314a is not replicated to master 215.

As set forth above, there are several drawbacks associated with prior art server mastered replication. For example, a user working at client 210 does not know if he is working with the most recently updated version of master 215. Thus, the user does not know whether local changes he makes at client 220 will be replicated to master 215. For example, a user working at client 220 does not know that the third row of master 215 was deleted at step 314b. Thus, the user does not know that the word he inserts into the third row of replica 225 at step 314a may not be replicated to master 215. Another such drawback is that, if server 210 reaches its full storage capacity, then master 215 may be deleted from server 210, with such deletion propagating to replica 225 at client 220.

Exemplary File Sharing System

Figure 4:
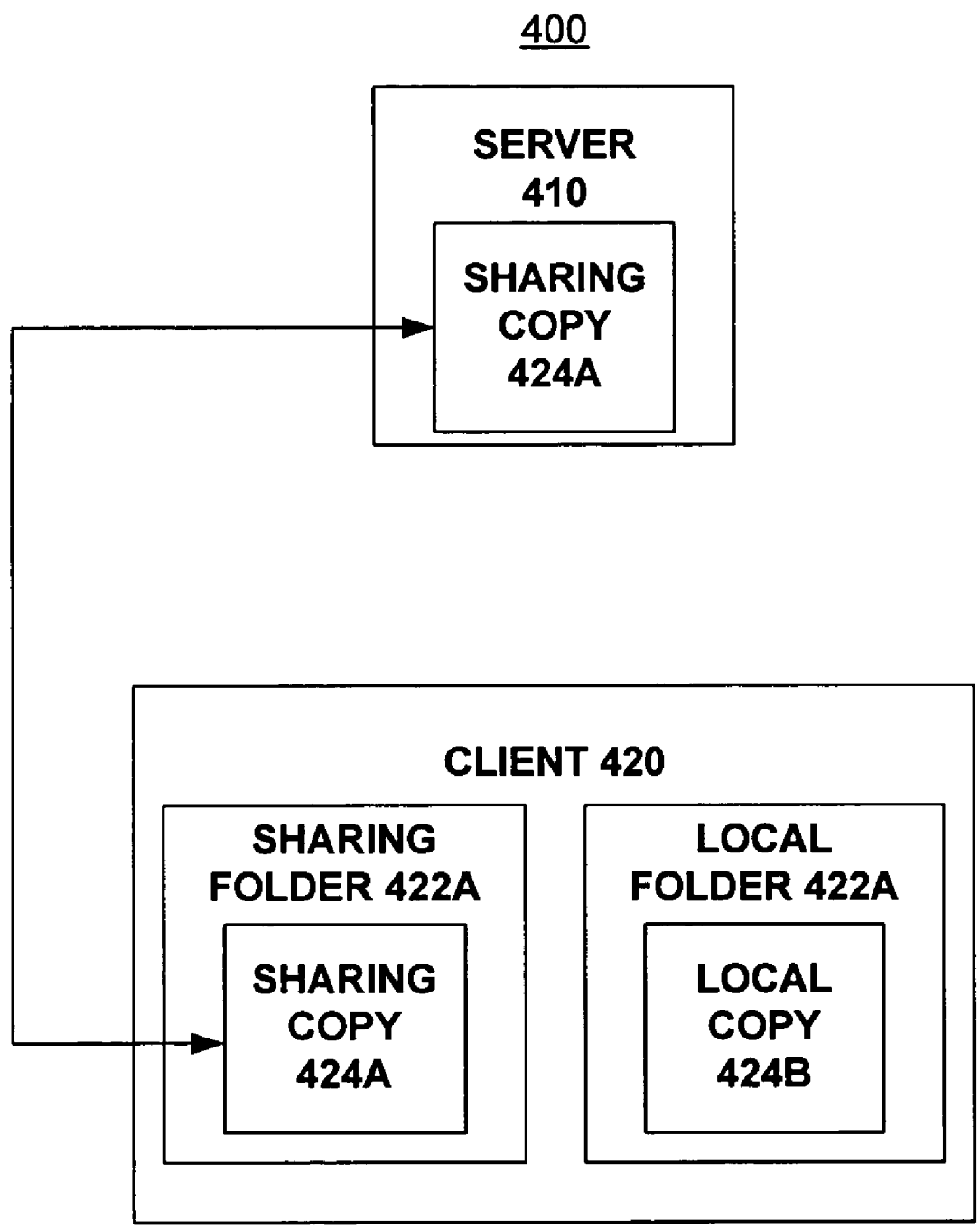
FIG. 4 is a block diagram of an exemplary prior art sharing folder replication system.

An exemplary prior art file sharing system is shown in FIG. 4. Generally, a local copy 424b of a file may be created and stored in a local folder 422b on client 420. To make the file available for replication to server 410, a sharing copy 424a of the file must be copied to sharing folder 422a. Sharing folder 422a may be configured to make its contents available to server 410. Changes may be made to sharing copy 424a at server 410.

As should be appreciated, client 420 may be directly to another client in place of or in addition to server 410 for peer to peer sharing. Furthermore, another client may be connected to client 420 via server 410. The other client may access and make changes to sharing copy 424a.

If client 410 is connected to multiple computing devices, such devices may request concurrent access of sharing copy 424a. Sharing copy 424a may be configured to provide concurrent access or to only provide access to a single device. Sharing copy 424a may also be configured to provide levels of concurrent access. For example, concurrent access may be provided on a paragraph by paragraph level, a section by section level, or a page by page level. If concurrent access to the file is not available, then the file may be configured to provide read only access to subsequent users.

A service provider such as an Internet Service Provider (ISP) may operate a subscription file sharing service. Client 420 may become a subscribing client if a user subscribes to the service at client 420. A user may subscribe to the service by, for example, connecting to server 410 and logging on to the service with signing with a password or identifier. The service provider may then copy sharing copy 424a from subscribing client 420 to server 410. The service provider may store a copy of sharing copy 424a at server 410. Users at other connected subscribing clients may then download sharing copy 424a and access and make changes to sharing copy 424a at the other connected subscribing clients.

As set for the above, there are several drawbacks associated with prior art sharing folder replication. Copying local file 424b and other local files to sharing folder 422a may be a time-consuming and tedious process. Another drawback is that multiple copies 424a and 424b of the same file are stored on client 420, with possibly one copy including more recent changes than the other copy. A user may have difficulty locating both such copies 424a and 424b in multiple folders 422a and 422b and determining which copy contains the most recent changes. Another drawback to sharing folder replication is that it is difficult for the user to achieve parity between the local folder structure 422b and the sharing folder structure 422a. The user is left with several management tasks with respect to synchronizing file structures and ensuring that the storage limit is not exceeded.

Systems and Methods of the Present Invention

The present invention is directed to systems and methods for client mastered replication. As will be discussed in detail below, the present invention enables a master version of a file to be created and stored on a client device. The master may be replicated on multiple other connected computing devices, enabling the file to be accessed at a variety of times and locations. For example, a user may create and store a master version of a document on a client computer at work. The user may then, via a server, access a replica of the file on another client computer at home. The user may make changes to the replica on the home computer and then replicate such changes back to the master on the work computer.

Unlike server mastered replication system 200 of FIG. 2, the present invention enables a user to work on the most updated version of the master at all times. Furthermore, the user may make local changes directly to the master without regard to whether such changes conflict with changes that are made on another computer. Additionally, changes made to a replica of the master on another computing device need not necessarily be replicated to the master. Thus, for example, when a connected server reaches its full storage capacity, a replica stored at the server may be deleted at the server without such deletion propagating to the master.

Unlike in the prior art sharing folder replication system of FIG. 4, a file need to not be copied to a sharing folder to be made available to other computing devices. The present invention enables a file to be selected for replication using an associated replication property. Thus, multiple copies of the same file need not be created and stored in multiple locations of the client computer, with one such copy possibly including more recent changes than another such copy. The replication property enables individual files and sub-folders to be selected for replication in addition to an entire folder.

Figure 5:
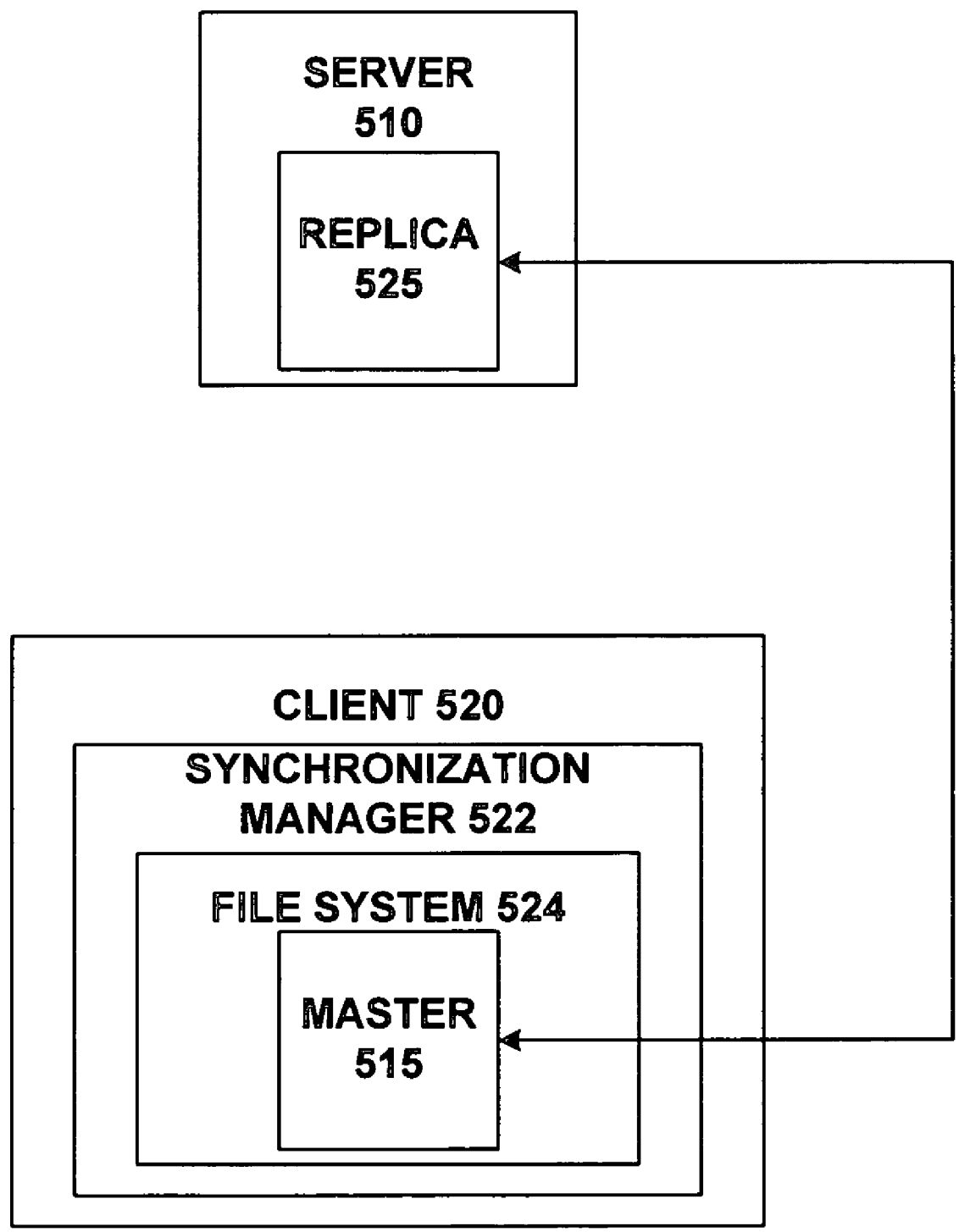
FIG. 5 is a block diagram of an exemplary client mastered replication system in accordance with the present invention.

An exemplary client mastered replication system 500 in accordance with the present invention is shown in FIG. 5. Generally, master 515 is stored at client 520, and replica 525 is stored at server 510. Client 520 may replicate master 515 to replica 525 at server 520. Changes to replica 525 may be made at server 510. If they do not conflict with local changes to master 515, then changes to replica 525 may be replicated back to master 515.

Synchronization manager 522 generally identifies new changes made to master 515 and propagates such new changes to replica 525. Synchronization manager 522 may be configured to replicate master 515 to server 510 in response to an event which occurs at client 520. For example, a replication time interval may be selected by a user at client 520, and master 515 may be replicated at an expiration of the selected time interval. Furthermore, master 515 may be replicated when it is closed at client 520, when it is saved at client 520, and when client 520 is shut down. Additionally, master 515 may be replicated to server 510 in response to a request from server 510.

File system 524 generally manages the organization and storage of master files and enables files to be selected for replication. A file may be selected for replication using an associated replication property. Files selected for replication may be created and stored at any location within client 520 and need not be copied to a sharing folder. In addition to a replication property, files may have associated replication options. Such replication options may include, for example, a replication level option which determines whether the entire contents of master 515 will be selected for replication or whether only portions of the contents will be selected. Replication may be selected, for example, on a paragraph by paragraph level, a section by section level, or a page by page level. Such replication options may also include a security option such as, for example, an identifier or password which must be provided to replicate master 515. Each level selected for replication may have its own associated security option.

Changes made to replica 525 at server 510 need not necessarily be propagated to client 520. Thus, if server 510 reaches its storage capacity, replica 525 may be deleted from server 510 without deleting master 515 from client 520. Client 520 may provide a replication notification to alert a user when master 515 is replicated or deleted at server 510. Such a notification may be a user interface such as, for example, an icon overlay in file system 524. When master 515 is replicated to server 510, the icon may be displayed. The icon may remain displayed as long as replica 525 is stored at server 515. However, if server 510 reaches its storage capacity and replica 525 is deleted from server 510, then the icon may be removed. A message may be displayed asking the user if he wishes to again replicate master 515 to server 510 or if he wishes to replicate master 515 to another computing device.

Figure 6:
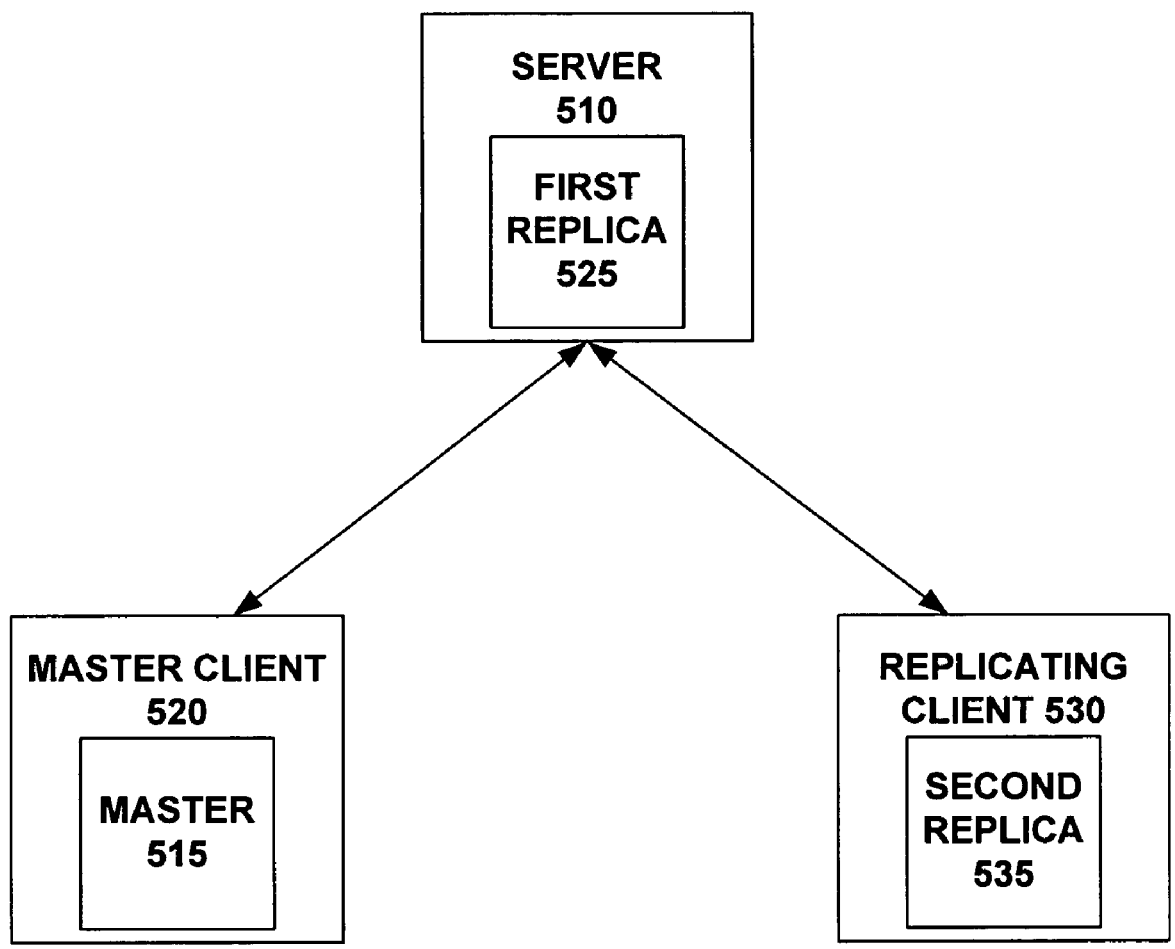
FIG. 6 is a block diagram of an exemplary client mastered replication system with a replication client in accordance with the present invention.

As should be appreciated, although only server 510 and client 520 are shown in FIG. 5, client 520 may be directly connected to another client in place of or in addition to server 510 for peer to peer replication. Furthermore, other client devices may be connected to server 510, with such other clients possibly replicating replica 525 from server 510. Referring now to FIG. 6, in addition to server 510 and master client 520, client mastered replication system 600 includes replicating client 230. Generally, replicating client 230 replicates first replica 525 from server 510 to second replica 535. Local changes to second replica 535 may be made at replication client 530 and replicated back to first replica 525.

Master client 520 may be, for example, a desktop computer at an office, while replicating client 530 may be a desktop computer at a residence. A user may create and store master file 515 on master client 520 at his office. When the user is ready to leave work, the user may select master file 515 for replication. Master client 520 will replicate master file 515 to server 510, and server 510 will store first replica 525. First replica 525 may, in turn, be replicated to second replica 535 on replication client 530. When the user returns home at night, the user may access and make changes to second replica 535 at replication client 530. Such home changes may be replicated back to first replica 525. First replica 525, including the user's home changes, may, in turn, be replicated back to master 515. When the user returns to work, the user may access master 515 including the user's home changes.

Multiple replication clients may be connected to server 510, with each such replication client having its own associated second replica. Conflicts may occur when such second replicas are replicated back to first replica 525. Thus, server 510 may replicate first replica 525 to its connected replication clients in accordance with a server mastered replication method such as the method set forth above in FIG. 4. To implement such a method, first replica 525 becomes a master file similar to master 215 of FIG. 2, with each second replica becoming a direct replica similar to replica 225 of FIG. 2. As should be appreciated, although first replica 525 may become a master file with respect to each second replica, first replica 525 remains a replica with respect to master file 515 at master client 520.

Figure 7:
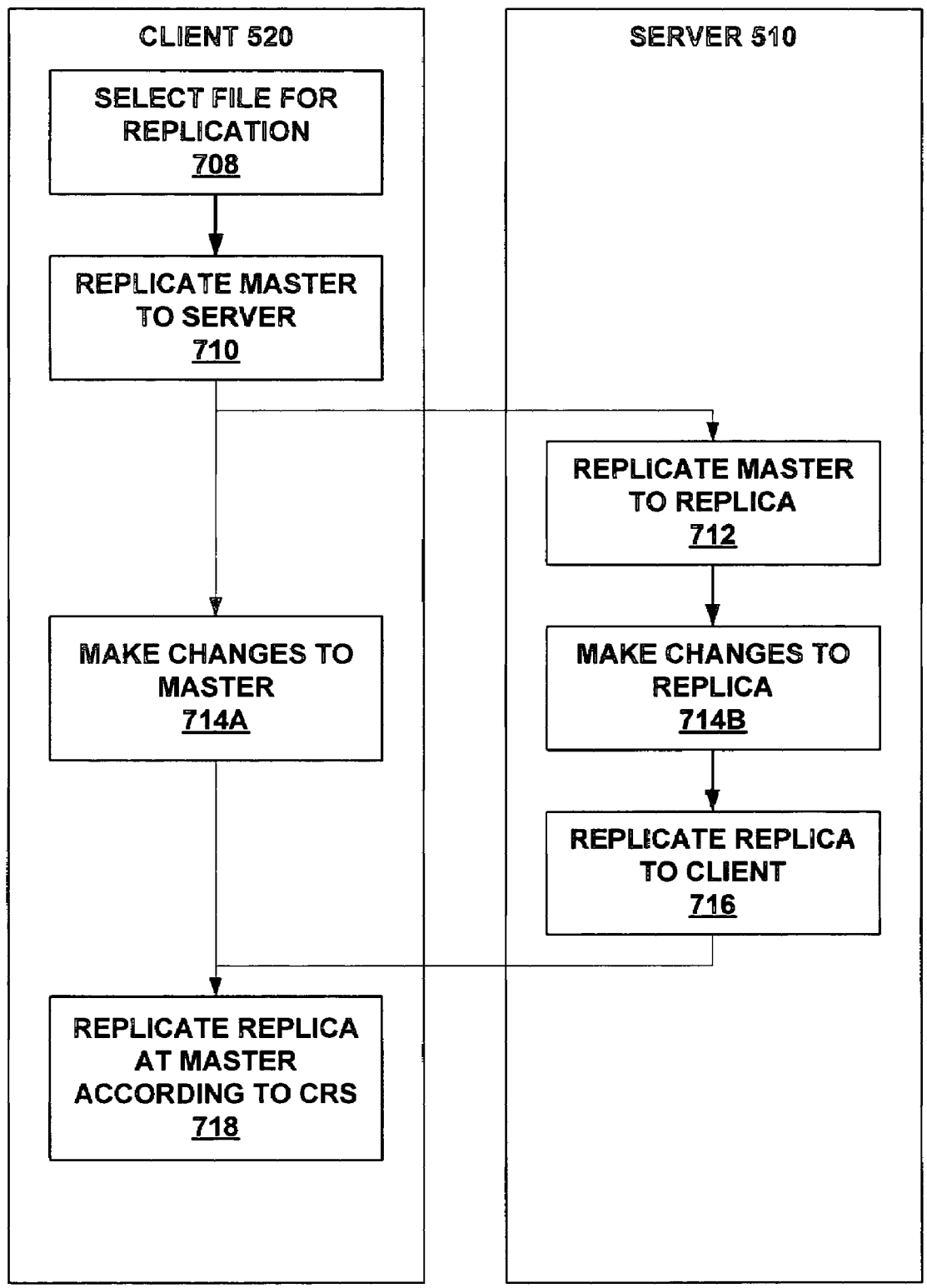
FIG. 7 is a flowchart of an exemplary method for client mastered replication in accordance with the present invention.

A flowchart of an exemplary method for client mastered replication in accordance with the present invention is shown in FIG. 7. Generally, a change to replica 525 may be related to a local change to master 515. For example, a particular row may be both modified in replica 525 and deleted in master 515. When such a related change is replicated from replica 525 back to master 515, such a related change may result in a conflict. The generation and resolution of such a conflict is discussed in detail below.

At step 708, master 515 is selected for replication. Master 515 may be selected for replication using its associated replication property. Master 515 may be selected for replication by, for example, opening master 515, clicking on a file drop down menu and then clicking on a properties option with an attached mouse. Clicking on the properties option may open a pop up menu displaying various file properties including the replication property. The user may check off the replication property by clicking its corresponding check box. Alternatively, the user may select the replication property by opening a list of contents for the folder in which master 515 is stored and right clicking on an icon for master 515. Once the replication property is selected, a list of replication options may be displayed using, for example, a pop up menu. The replication options may be selected and configured from such a menu.

At step 710, client 510 replicates master 515 to server 510. Master 515 may be replicated to server 510 by identifying new changes to master 515 and replicating such new changes to server 510.

At step 712, server 510 replicates master 515 to replica 525. As set forth above, replica 525 may, in turn, be replicated to second replica 535 at replication client 530.

At step 714a, local changes are made to master 515 at client 520. For example, the third row of master 515 may be deleted.

At step 714b, changes are made to replica 525 at server 510. For example, words may be inserted into both the third row and the seventh row of replica 525. As set forth above, the changes made to replica 525 at step 714b need not necessarily originate from server 510. Rather, such changes may be made locally at replication client 530. Such changes may then be replicated back to replica 525 at step 714b.

At step 716, server 510 replicates replica 525 to client 510. Replica 525 may be replicated to client 520 by identifying the changes made at step 714b and replicating such changes to client 520.

At step 718, client 510 replicates replica 525 to at master 515 according to a conflict resolution scheme. It may first be determined whether any conflicts exist between the local changes made at step 714a and the server changes made at step 714b. If no conflicts exist, then the server changes made at step 714b are replicated to master 515. If there are existing conflicts, then a conflict resolution scheme may be implemented.

For example, because the seventh row of master 515 was not previously deleted at step 714a, the word inserted into the seventh row of replica 525 at step 714b may also be inserted into the seventh row (now the sixth row) of master 515. However, because the third row of master 515 was previously deleted at step 714a, the word that was inserted into the third row of replica 525 at step 714b cannot be inserted into the third row of master 515 at step 718. Thus, a conflict is present. There are several conventional conflict resolution schemes that are well know in the art that may be implemented at step 718.

For example, in one conventional conflict resolution scheme, if conflicts are present, then the entire transaction is rolled back and none of the server changes are replicated at master 515. An error message may be displayed at server 515 and/or replication client 230 to alert a user that there are existing conflicts and that the transaction has been rolled back. For example, an error message may be displayed at server 515 and/or replication client 230 indicating that neither of the words inserted into replica 225 at step 714b have been replicated to master 515.

In another conventional conflict resolution scheme, if conflicts are present, then only the non-conflicting changes are replicated at master 515. An error message may be displayed at server 515 and/or replication client 230 to alert a user that there are existing conflicts and that the conflicting changes have not been replicated. For example, an error message may be displayed server 515 and/or replication client 230 indicating that the word inserted into the seventh row of replica 525 at step 714b has been replicated to master 515, but the word inserted into the third row of replica 525 at step 714b has not been replicated to master 215.

CONCLUSION

Thus, the present invention enables a master file to be created and stored on a client device. Changes to the master file may be made locally at the client computing device. Changes to the master file may be replicated to a connected computing device such as a server. Changes to a replica of the master file may be made at the connected computing device. If they do not conflict with local changes the to master file, changes to a replica may be replicated back to the master file.

While the present invention has been described in connection with the preferred embodiments of the various figures, it is to be understood that other similar embodiments may be used or modifications and additions may be made to the described embodiment for performing the same function of the present invention without deviating therefrom. For example, a master file may be replicated a plurality of servers, with each such server replicating changes back to the client. Therefore, the present invention should not be limited to any single embodiment, but rather should be construed in breadth and scope in accordance with the appended claims.

What is claimed:

1. A method for client mastered replication comprising:
   receiving a selection of a master file on a master client device;
   defining a replication property of the master file to indicate its selection for replication;

receiving a selection of at least one replication option for the master file, wherein each replication option is a replication level option indicating an associated portion of the master file to be replicated and wherein each replication option is associated with a security option for controlling replication of the associated portion of the master file, wherein the associated portion of the master file is indicated on a paragraph by paragraph level, a section by section level or a page by page level;

creating a first replica file on a server device based upon the master file in conformance with the at least one replication option;

when the first replica file is created or deleted, providing a notification to a user, wherein the notification is display of an icon or removal of an icon;

receiving at least one change made to the master file;

upon an event, synchronizing changes made at the master file to the first replica file;

applying a server mastered replication scheme to the first replica file on the server with respect to each of at least one replicating client device; and synchronizing the first replica file on the master client device to the master file on the master client device using a conflict resolution scheme.

2. The method of claim 1, wherein the server mastered replication scheme comprises:
replicating the first replica file to each of at least one second replica file respectively on each of the at least one replicating client devices;
receiving at least one change made to a second replica on an associated replicating client;
replicating the at least one change on the associated replicating client to the replica on the server.

3. The method of claim 1, wherein creating a first replica file on the server device based upon the master file comprises:
replicating the master file to the server device; and
replicating the master file on the server to the first replica file.

4. The method of claim 1, wherein synchronizing the fist replica file on the master client device to the master file on the master client device using a conflict resolution scheme comprises:
replicating the first replica file to the master client;
synchronizing the first replica file to the master client file using a conflict resolution scheme.

5. The method of claim 1, wherein the event is:
an expiration of a time interval or a request from the server.

6. The method of claim 1, further comprising:
receiving by the master client computing device from the connected server a copy of the change; and
determining whether to replicate the change from the first replica to the master file.

7. A computer readable storage medium comprising instructions for:
receiving a selection of a master file on a master client device;
defining a replication property of the master file to indicate its selection for replication;
receiving a selection of at least one replication option for the master file, wherein each replication option is a replication level option indicating an associated portion of the master file to be replicated and wherein each replication option is associated with a security option for controlling replication of the associated portion of the master file, wherein the associated portion of the master file is indicated on a paragraph by paragraph level, a section by section level or a page by page level;

creating a first replica file on a server device based upon the master file in conformance with the at least one replication option;

when the first replica file is created or deleted, providing a notification to a user, wherein the notification is display of an icon or removal of an icon;

receiving at least one change made to the master file;

upon an event, synchronizing changes made at the master file to the first replica file;

applying a server mastered replication scheme to the first replica file on the server with respect to each of at least one replicating client device; and synchronizing the fist replica file on the master client device to the master file on the master client device using a conflict resolution scheme.

8. The computer readable storage medium of claim 7, further compromising instructions for:
replicating the first replica file to each of at least one second replica file respectively on each of the at least one replicating client devices;
receiving at least one change made to a second replica on an associated replicating client;
replicating the at least one change on the associated replicating client to the replica on the server.

9. The computer readable storage medium of claim 7, further comprising instructions for:
replicating the master file to the server device; and
replicating the master file on the server to the first replica file.

10. The computer readable storage medium of claim 7, further comprising instructions for:
replicating the first replica file to the master client;
synchronizing the first replica file to the master client file using a conflict resolution scheme.

11. The computer readable storage medium of claim 7, wherein the event is an expiration of a time interval or a request from the server.

12. The computer readable storage medium of claim 7, further comprising instructions for:
receiving by the master client computing device from the connected server a copy of the change; and
determining whether to replicate the change from the first replica to the master file.

13. A system comprising:
a processor operative to execute computer-executable instructions; and
memory having stored therein computer-executable instructions for performing a process comprising:
receiving a selection of a master file on a master client device;
defining a replication property of the master file to indicate its selection for replication;
receiving a selection of at least one replication option for the master file, wherein each replication option is a replication level option indicating an associated portion of the master file to be replicated and wherein each replication option is associated with a security option for controlling replication of the associated portion of the master file, wherein the associated portion of the master file is indicated on a paragraph by paragraph level, a section by section level or a page by page level;
creating a first replica file on a server device based upon the master file in conformance with the at least one replication option;

when the first replica file is created or deleted, providing a notification to a user, wherein the notification is display of an icon or removal of an icon;

receiving at least one change made to the master file;

upon an event, synchronizing changes made at the master file to the first replica file;

applying a server mastered replication scheme to the first replica file on the server with respect to each of at least one replicating client device; and synchronizing the fist replica file on the master client device to the master file on the master client device using a conflict resolution scheme.

14. The system of claim 13, wherein the process further comprises:

replicating the master file to the server device; and replicating the master file on the server to the first replica file.

15. The system of claim 13, wherein the process further comprises:

replicating the first replica file to the master client;

synchronizing the first replica file to the master client file using a conflict resolution scheme.

16. The system of claim 13, wherein the event is an expiration of a time interval or a request from the server.

17. The system of claim 13, wherein the process further comprises:

receiving by the master client computing device from the connected server a copy of the change; and determining whether to replicate the change from the first replica to the master file.

* * * * *